United States Patent
Jones et al.

(10) Patent No.: US 6,269,983 B1
(45) Date of Patent: Aug. 7, 2001

(54) METERED MATERIAL DISPENSER

(75) Inventors: Clint M. Jones, Loudonville; Victor DesRosiers, Kinderhook; James E. Johanson, Chatham; Fedor Baranov, East Greenbush; James P. Stevens, Castleton; Brian P. Couchey, Chatham; Gerd Rieker, Troy, all of NY (US); William Leidel, Greer, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/318,976

(22) Filed: May 26, 1999

(51) Int. Cl.$^7$ ....................................................... G01F 11/28
(52) U.S. Cl. ............................................ 222/441; 222/456
(58) Field of Search .................................... 222/456, 438, 222/454, 543, 441

(56) References Cited

U.S. PATENT DOCUMENTS

| | | |
|---|---|---|
| 576,241 | 2/1897 | van Ame . |
| 897,453 | 9/1908 | Byam . |
| 1,084,530 | 1/1914 | Bettman . |
| 1,270,262 | 6/1918 | Buckland . |
| 1,618,688 * | 2/1927 | Tempest ................................ 222/456 |
| 1,707,967 | 4/1929 | Abbott . |
| 1,763,449 * | 6/1930 | Trautvetter ............................ 222/456 |
| 1,877,808 | 9/1932 | Cagliostro . |
| 1,891,787 | 12/1932 | Swartz . |
| 2,423,784 | 7/1947 | Mackey ................................ 222/456 |
| 2,644,616 | 7/1953 | Gordon ................................ 222/183 |
| 2,704,623 | 3/1955 | Yasso ................................... 222/456 |
| 3,172,580 | 3/1965 | Mackey ................................ 222/456 |
| 3,229,856 | 1/1966 | Jungmann ........................... 222/142.4 |
| 3,323,683 | 6/1967 | Cianciolo .......................... 222/142.6 |
| 4,424,921 * | 1/1984 | Feuerstein et al. ................... 222/456 |
| 4,961,521 | 10/1990 | Eckmann .......................... 222/142.5 |
| 5,024,616 * | 6/1991 | Ogle, II ................................. 604/192 |
| 5,169,049 | 12/1992 | Krupic et al. ........................ 227/456 |

* cited by examiner

*Primary Examiner*—Kevin Shaver
*Assistant Examiner*—Thach H Bui
(74) *Attorney, Agent, or Firm*—Seidel Gonda Lavorgna & Monaco, PC (57) ABSTRACT

A dispenser is provided for sprinkling a preset quantity of granted material, such as table salt. The dispenser comprises a granulated material reservoir, an enclosure, a metering cup, a cap, a collector and a diffuser. The reservoir has a side, a top and a bottom wall. The enclosure encases the reservoir side wall and is closed at one end by a cap adjacent to the reservoir bottom wall. The metering cup is positioned in the cap and an opening in the reservoir bottom wall communicates with and fills the metering cup. A collector is positioned adjacent to the top wall of the reservoir. A passageway formed between the reservoir sidewall and the enclosure communicates with the metering cup and collector. The diffuser is positioned adjacent to an opening in the collector and opposite the collector. When the dispenser is in the upright position, granulated material from the reservoir fills the metering cup. When the dispenser is inverted, the granulated material flows from the metering cup through the passageway to the collector. The collector directs the granulated material to the diffuser that sprinkles the granulated material over a desired area.

21 Claims, 7 Drawing Sheets

METERED MATERIAL DISPENSER

FIELD OF THE INVENTION

The present invention generally relates to a dispenser for sprinkling a preset amount of granulated material, such as table salt, ground pepper, table sugar and the like.

BACKGROUND OF THE INVENTION

Various types of dispensers are commonly used to add seasonings and flavorings to foods and beverages. Typically, for example, seasonings such as table salt and ground pepper are dispensed from shakers comprising single-chamber containers having top walls containing a plurality of apertures to allow the contained material to be dispensed upon inverting and shaking the shakers. The number and sizes of the apertures generally vary with the type of material to be dispensed.

Many prior dispensers address the problem of over-dispensing or, more particularly, the need to dispense a controlled amount when desired. Some of the prior dispensers comprise two chambers and a delivery tube. The first chamber forms a material reservoir. The second chamber is calibrated for measuring the material. One chamber is located above the other. The delivery tube communicates with the measuring chamber at one end, extends through the reservoir chamber, and at the opposite end communicates with the exterior of the dispenser. Bettman U.S. Pat. No. 1,084,530; Buckland U.S. Pat. No. 1,270,262; Abbott U.S. Pat. No. 1,707,967; Cagliostro U.S. Pat. No. 1,877,808; Trautvetter U.S. Pat. No. 1,763,449; Gordon U.S. Pat. No. 2,644,616; and Feuerstein et al. U.S. Pat. No. 4,434,921 are exemplary of this type of construction.

Eckman U.S. Pat. No. 4,961,521 discloses an adjustable metered dispenser that is capable of dispensing seasonings such as salt and pepper. Eckman's dispenser comprises two chambers arranged in series. The first chamber is a material reservoir and the second chamber is a measuring chamber. Eckman's dispenser includes the ability to shut off the metering chamber from the reservoir chamber when the material is dispensed. Thus, in order avoid over-dispensing, the user must be sure that the passageway between the two chambers is closed.

Krupic, et al. U.S. Pat. No. 5,169,049 also discloses a shaker for dispensing seasonings such as salt and pepper. The device comprises three chambers: a material reservoir chamber, a measuring chamber and a dispensing chamber. The reservoir chamber is disposed between the measuring chamber and the dispensing chamber and a delivery tube communicates with the measuring chamber and the dispensing chamber. When the dispenser is in the non-use position, the measuring chamber is on the bottom. Upon use, the dispenser is inverted, and the dispensing chamber is filled with the material from the measuring chamber. The material must then be dispensed by shaking the dispenser in the inverted position to evacuate the material from the dispensing chamber via a plurality of apertures. In order to prevent over dispensing, one embodiment of the device includes shake-back guards within the reservoir chamber.

BRIEF SUMMARY OF THE INVENTION

The present invention comprises a granulated material reservoir having side, top and bottom walls, an outer enclosure, a cap, a metering cup, a collector and a diffuser. The enclosure encases the sidewall of the reservoir and is closed on one end with a cap. Located within the cap is the metering cup for receiving a quantity of granulated material. The metering cup determines the amount of material that will be dispensed. In its upright position, an opening in the bottom wall of the reservoir fills the metering cup with the granulated material to be dispensed. Upon inverting the dispenser, the granulated material in the metering cup flows into a passageway defined by the space between the enclosure and the reservoir. The passageway communicates with the metering cup and the collector, allowing delivery of the granulated material from the metering cup to the collector. While the dispenser is inverted, the granulated material flows through the collector opening onto the diffuser that is supported adjacent to the collector opening and opposite the collector. The diffuser spreads the preset quantity of granulated material over the desired area. Returning the dispenser to the upright position refills the metering cup for the next use.

For a better understanding of the invention, its advantages and the specific objects obtained by its uses, reference should be made to the accompanying drawings and detailed description which illustrate preferred embodiments of the invention.

BRIEF DESCRIPTION OF THE DRAWINGS

For the purpose of illustrating the invention, the drawings show forms of the invention which are presently preferred. However, it should be understood that this invention is not limited to the precise arrangements and instrumentalities shown in the drawings.

DETAILED DESCRIPTION OF THE DRAWINGS

Figure 1:
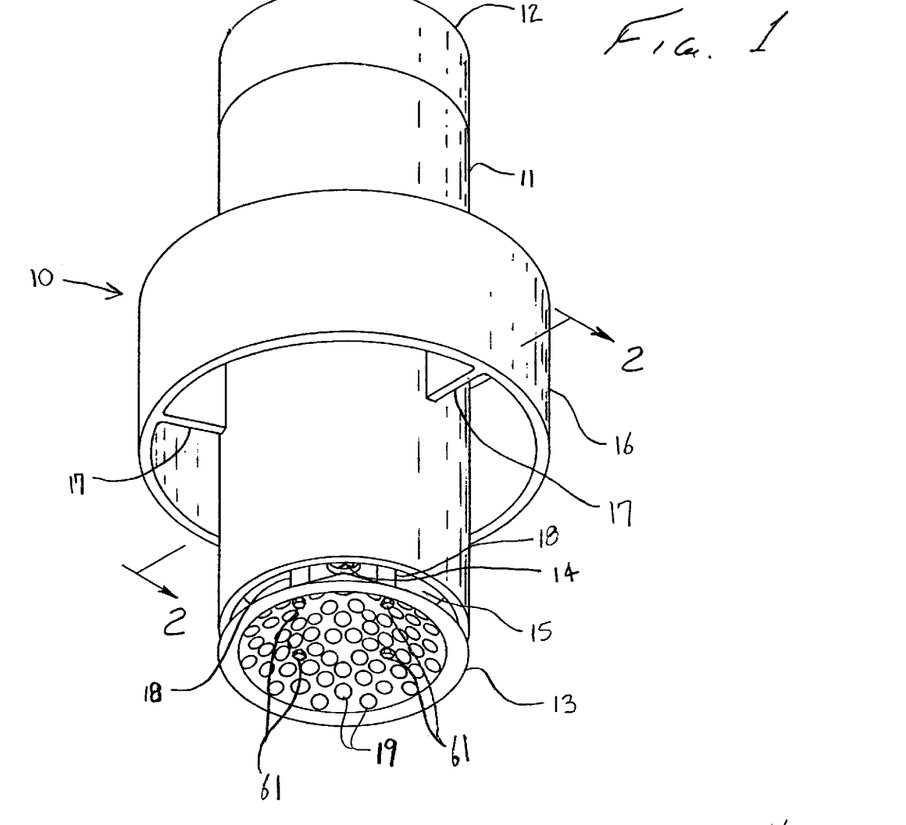
FIG. 1 is a perspective view from below of one embodiment of the present invention shown in an inverted position.

Referring now to the drawings wherein like numerals indicate like elements, FIGS. 1–6 show one embodiment of a dispenser which is generally identified by the numeral 10. FIG. 1 is a perspective view that shows the dispenser 10 in the inverted position. The dispenser 10 has a cylindrical enclosure 11, a circular cap 12, a conical diffuser 13 and a handle 16. The conical diffuser 13 is fixedly attached to a collector 15 by connecting posts 18. Disposed in the center of the collector 15 is a collector opening 14. The conical diffuser 13 is positioned with its tip adjacent to the collector opening 14. The conical diffuser 13 has a plurality of apertures 19 disposed throughout. The annular handle 16 is fixedly attached to the enclosure 11 by handle connecting tabs 17.

Figure 2:
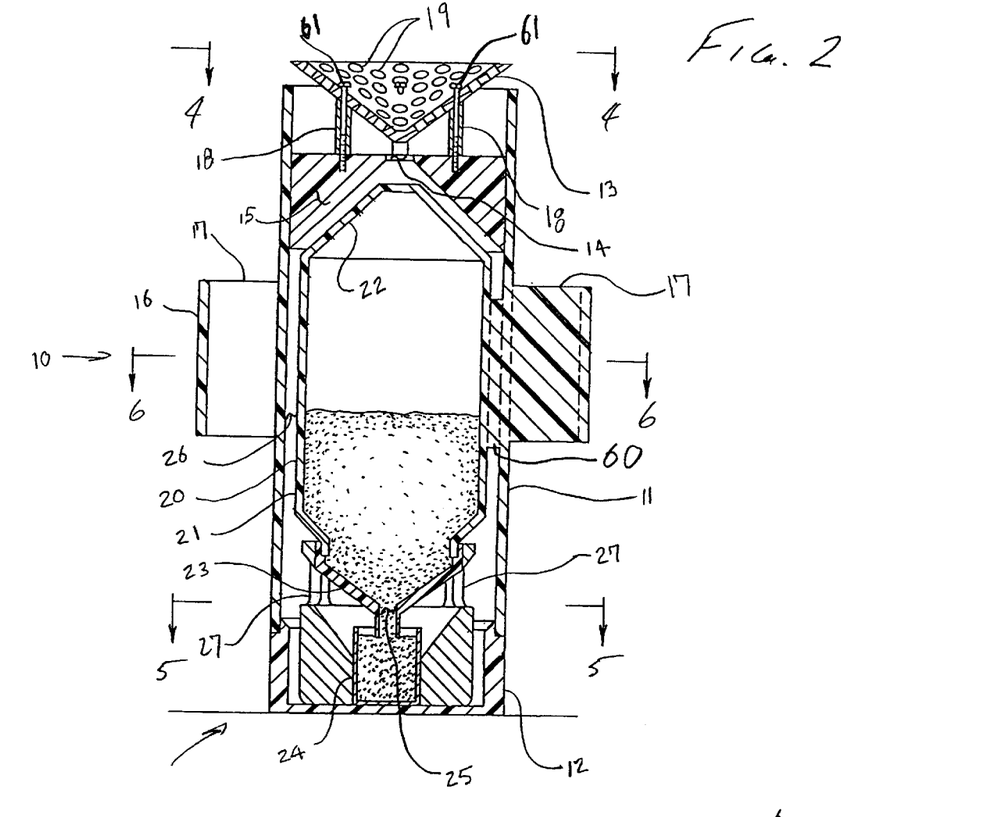
FIG. 2 is a cross-sectional view taken along line 2—2 in FIG. 1.
Figure 3:
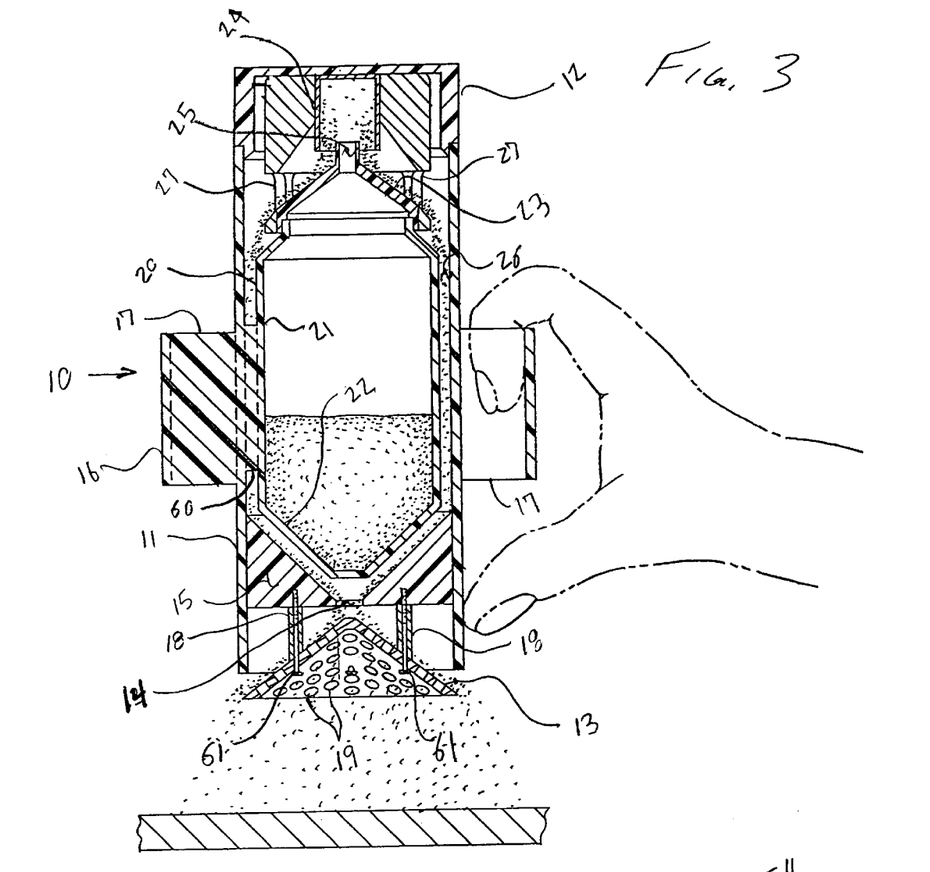
FIG. 3 is an environmental cross-sectional view of the embodiment shown in FIG. 1.

FIGS. 2 and 3 show the internal features of the dispenser 10. The granulated material reservoir 20 has a side wall 21, a top wall 22, and a bottom wall 23. The side wall 21 of reservoir 20 is cylindrical and positioned within and concentric with the cylindrical enclosure 11. The space between the enclosure 11 and the reservoir side wall 21 forms a passageway 26 that communicates with a metering cup 24 and the collector 15. The reservoir 20 is fixedly positioned within the enclosure 11 by reservoir connecting tabs 60 that are fixedly connected to the enclosure 11 and the reservoir side wall 21.

The cone-shaped reservoir top wall 22 matches the shape of the interior of the collector 15 to maximize the storage volume of the reservoir 20. The bottom wall 23 of the reservoir 20 is similarly cone-shaped in the opposite direction to facilitate filling of the metering cup 24. When the dispenser 10 is in the upright position, as shown in FIG. 2, a reservoir bottom wall opening 25 communicates with and fills the metering cup 24 with a quantity of granulated material.

The cap 12, metering cup 24 and reservoir bottom wall 23 form an integrated unit utilizing connecting tabs 27 that fixedly attach the reservoir bottom wall 23 to the cap 12. The integrated cap 12, metering cup 24 and reservoir bottom wall 23 can be secured to the enclosure 11 or the reservoir side wall 21 by means of a press-fit or snap-fit connection, a threaded connection or the like. When the dispenser is inverted, as shown in FIG. 3, granulated material flows out of the metering cup 24 and through passageway 26 to the collector 15. The collector 15 then directs the granulated material through the collector opening 14 onto the diffuser 13. The cone shape of the interior of the collector 15 facilitates the delivery of the granulated material from the passageway 26 to the collector opening 14. The diffuser 13 then spreads the granulated material as it falls through the collector opening 14, along the diffuser 13, and through the plurality of apertures 19 to the desired location below.

Figure 4:
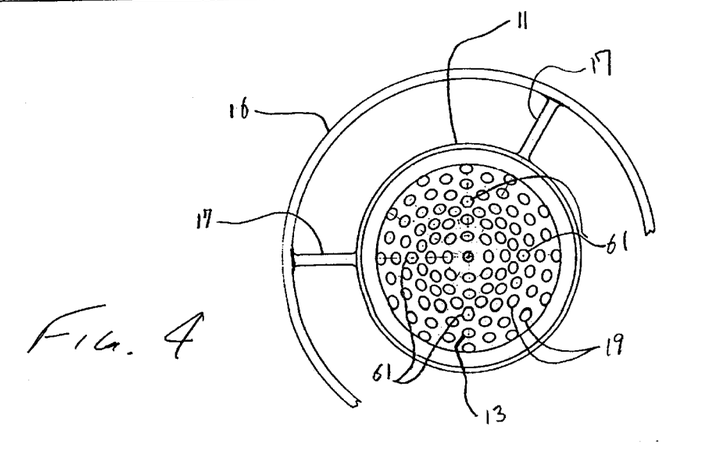
FIG. 4 is a partial plan view taken along line 4—4 in FIG. 2.

FIG. 4 is a partial plan of the dispenser 10 showing the orientation of the conical diffuser 13 with respect to the enclosure 11 and the handle 16. Also shown is the configuration of the apertures 19 in the diffuser 13, the locations of the diffuser fasteners 61, and the handle connecting tabs 17 that fixedly attach the annular handle 16 to the dispenser enclosure 11.

Figure 5:
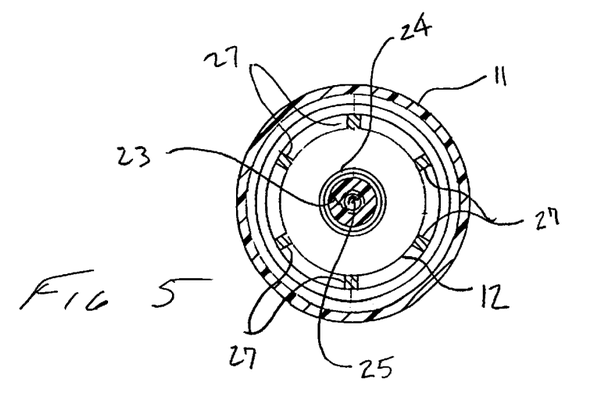
FIG. 5 is a cross-sectional view taken along line 5—5 in FIG. 2.

FIG. 5 is a section through the dispenser 10 in the region of the reservoir bottom wall 23 and reservoir bottom wall opening 25. Below the reservoir bottom wall opening is the metering cup 24 that is disposed within the cap 12. The bottom wall connecting tabs 27 are spaced uniformly around the conical reservoir bottom wall 23 and fixedly attach the reservoir bottom wall 23 to the cap 12. Thus, the metering cup 24, the reservoir bottom wall 23 and the cap 12 form an integrated unit that secures to the enclosure 11 and seals the reservoir 20 as shown in FIGS. 2 and 3.

Figure 6:
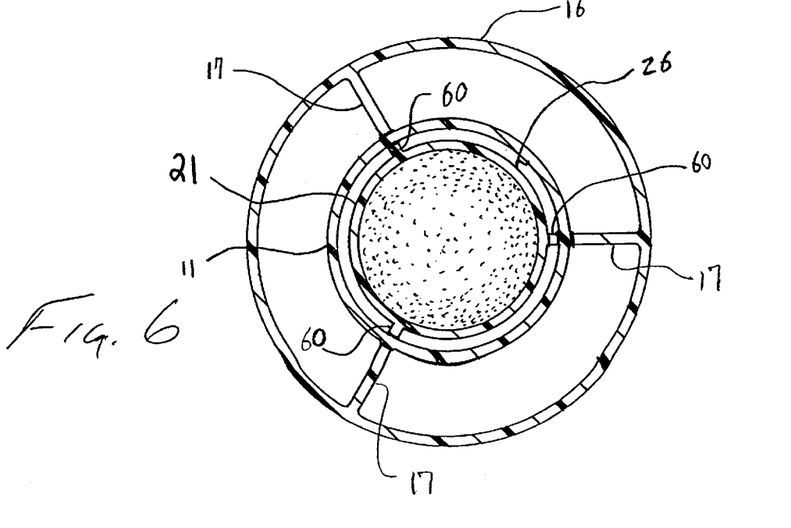
FIG. 6 is a cross-sectional view taken along line 6—6 in FIG. 2.

FIG. 6 is a section through the dispenser 10 showing the locations and connectivity of the reservoir side wall 21, enclosure 11 and annular handle 16. The reservoir side wall 21 is fixedly attached to the dispenser enclosure by reservoir connecting tabs 60. The space between the reservoir side wall 21 and the enclosure 11 form the passageway 26 through which granulated material passes. The annular handle 16 is fixedly attached to the dispenser enclosure by handle connecting tabs 17.

The method of using the embodiment shown in FIGS. 1–6 is as follows. A user grasps the dispenser 10 by placing fingers between the annular handle 16 and the enclosure 11 and steadying the dispenser 10 with the thumb against the enclosure 11 (see FIG. 3). The user then lifts and inverts the dispenser 10 from the position shown in FIG. 2 and removes the cap 12, metering cup 24 and reservoir bottom wall 23 from the dispenser 10. The user fills the reservoir 20 with the appropriate granulated material, such as table salt, and secures the integrated cap 12, metering cup 24 and reservoir bottom wall 23 to the dispenser 10. The user then restores the dispenser 10 to the upright position, shown in FIG. 2, to allow gravity to fill the metering cup 24 through the reservoir bottom wall opening 25. To dispense the granulated material, the user inverts the dispenser 10 to the position shown in FIG. 3. Inverting the dispenser 10 causes the granulated material to fall out of the metering cup 24 and through passageway 26 to the collector 15. The collector 15 directs the granulated material through the collector opening 14 onto the diffuser 13. The granulated material passes over the diffuser 13 and falls through a plurality of apertures 19, sprinkling evenly over the desired area below the diffuser 13. To dispense another preset amount of granulated material, the user restores the dispenser 10 to the upright position and re-inverts the dispenser 10 as described above.

Figure 7:
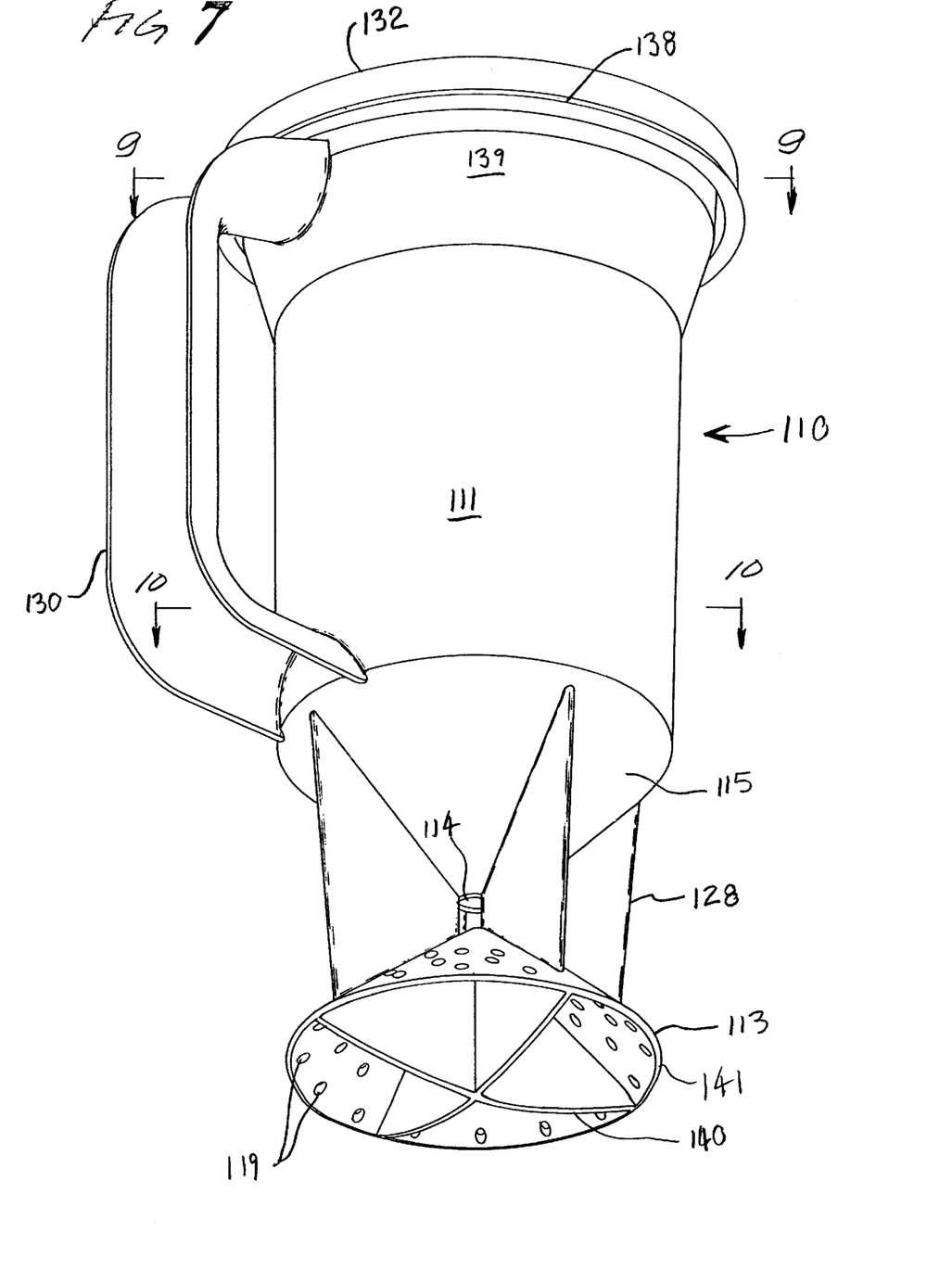
FIG. 7 is a perspective view from below of a second embodiment of the present invention shown in an inverted position.

FIGS. 7–11 show a second embodiment of a dispenser, which is generally identified by the numeral 110. FIG. 7 is a perspective view that shows the dispenser 110 in the inverted position. The dispenser 110 has a generally cylindrical enclosure 111 having a flared end 139. A cone-shaped collector 115 is located opposite the flared end 139. A cap retaining member 132 engages the flared end 139 of the enclosure 111 and retains a cap (not shown) which closes the flared end 139. A flange 138 projects radially outward from the cap retaining member 132. A handle 130 is attached at one end to the enclosure 111 adjacent the collector 115. The opposite end of the handle 130 is attached to the flared end 139 of the enclosure 111. The handle 130 is adapted to accommodate a full-fisted grip of the user.

A cone-shaped diffuser 113 having a plurality of apertures 119 disposed therethrough is located adjacent the collector 115. The tip of the diffuser 113 is located adjacent a collector opening 114. Opposite the tip of the diffuser 113 is a rim 141. The diffuser 113 is fixedly attached to the collector 115 by baffle walls 128. Each baffle wall 128 extends from the collector 115, through the diffuser 113, and to a curved edge 140 which extends beyond the rim 141 of the diffuser 113.

Figure 8:
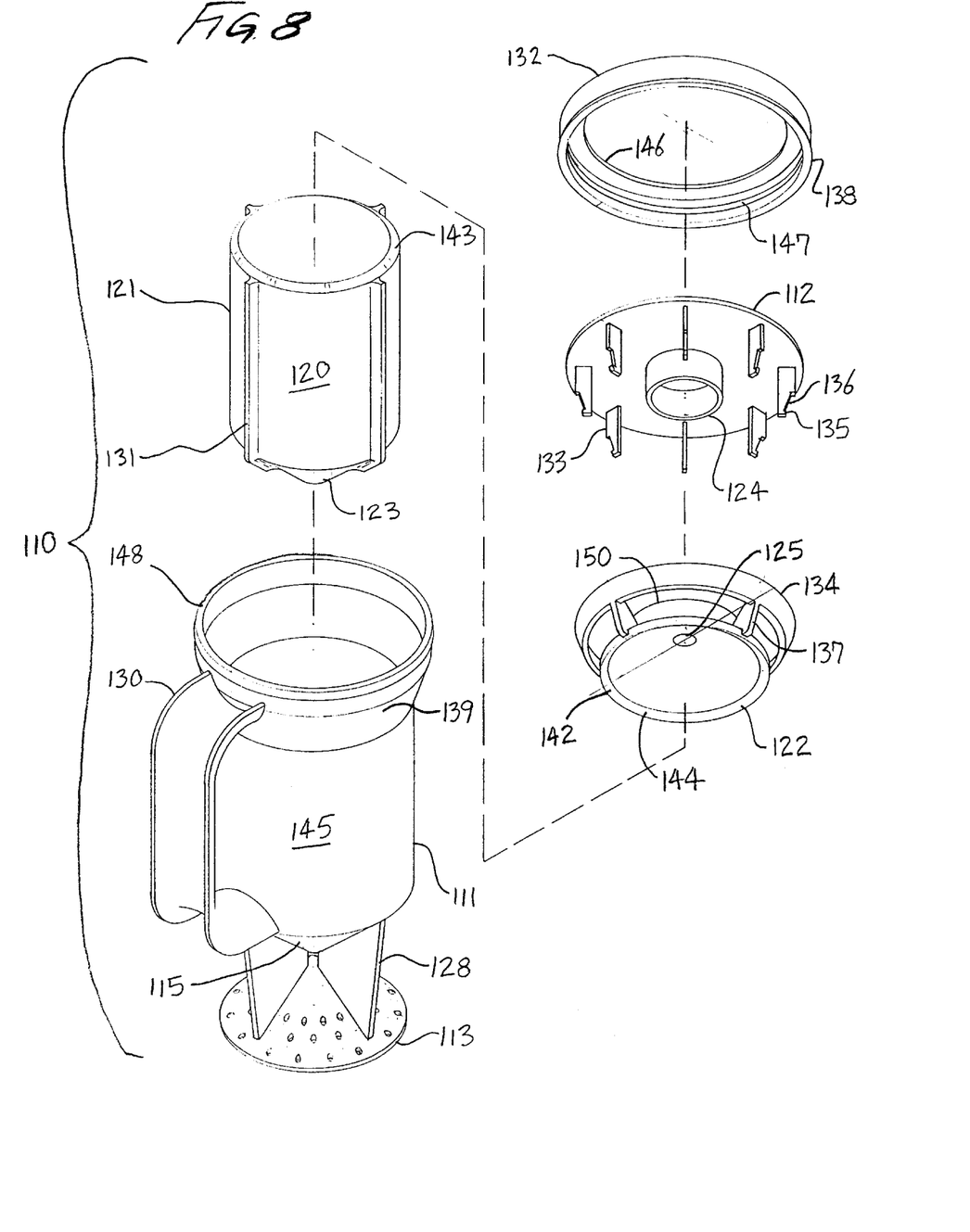
FIG. 8 is an exploded perspective view of the second embodiment of the present invention showing the various components thereof.
Figure 9:
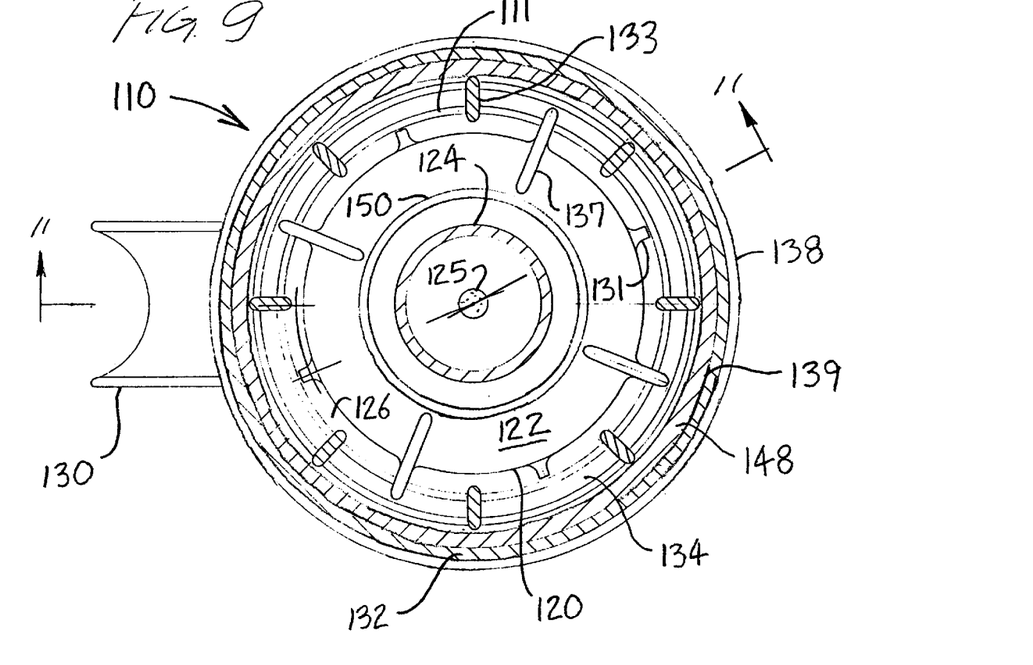
FIG. 9 is a cross-sectional view taken along line 9—9 in FIG. 7.
Figure 10:
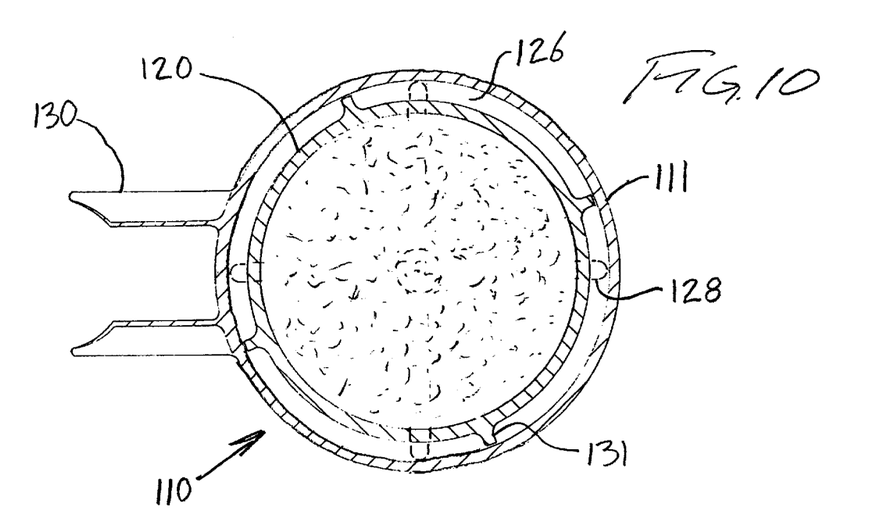
FIG. 10 is an environmental cross-sectional view taken along line 10—10 in FIG. 7.
Figure 11:
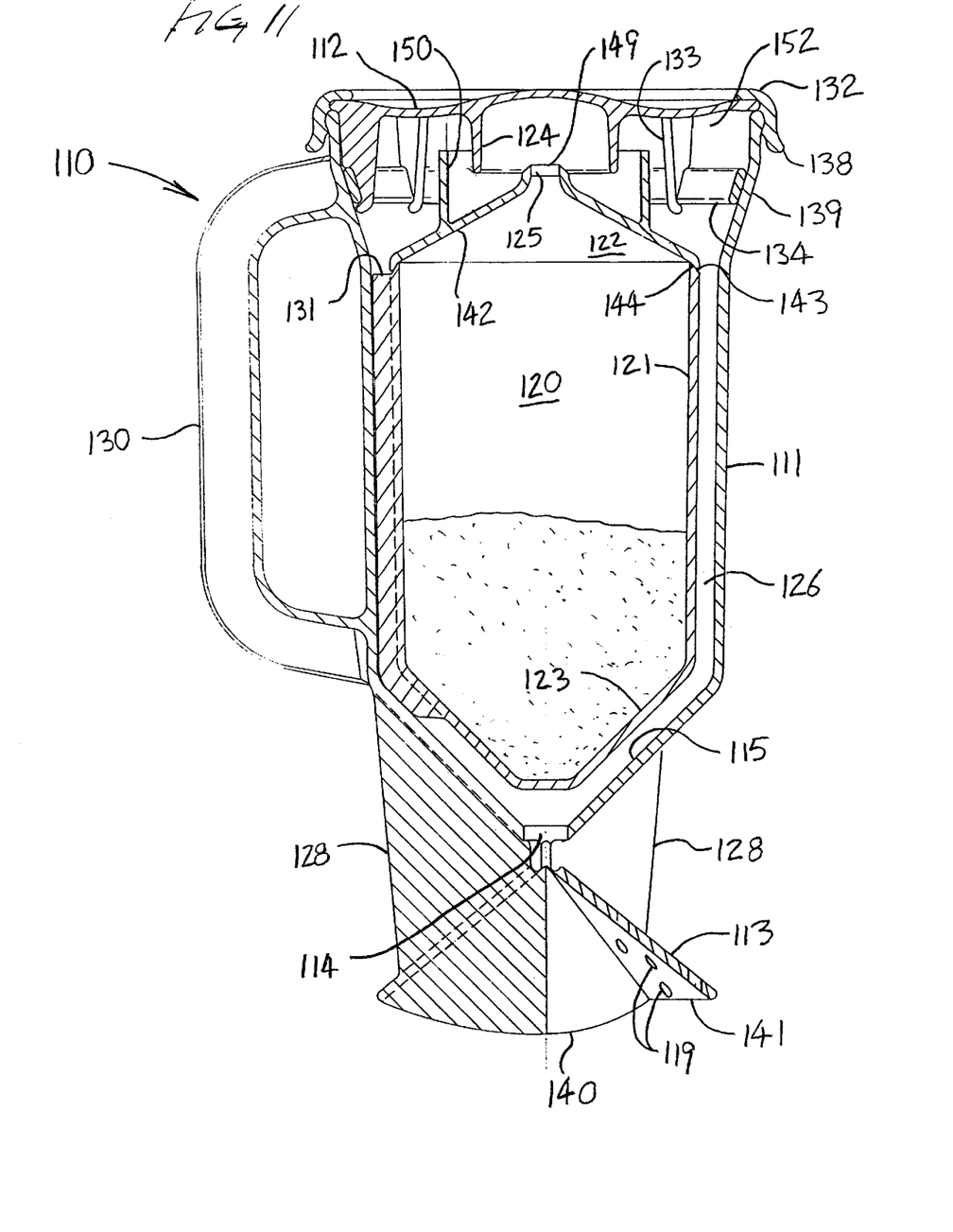
FIG. 11 is an environmental cross-sectional view taken along line 11—11 in FIG. 9.

FIG. 8 is an exploded perspective view which shows the individual components of the dispenser 110. The relationship of the components in the assembled dispenser 110 is shown in FIGS. 9–11. The first component is the body 145 of the dispenser 110. The body 145 is of unitary construction which includes the cylindrical enclosure 111, the flared end 139, the collector 115, the baffle walls 128, the conical diffuser 113 and the handle 130. The body 145 can be made from plastic, metal or the like. A flange 148 surrounds the opening at the flared end 139 of the dispenser 110. The flange 148 projects radially outward from the dispenser 110 and is adapted to engage the cap retaining member 132 by press fit as explained below.

Another component of the dispenser 110 is the material reservoir 120. The material reservoir 120 includes a side wall 121, a top wall 123, and reservoir spacing tabs 131. The side wall 121 is cylinder in shape. The reservoir 120 is nestable within the enclosure 111. When the dispenser 110 is assembled, the plurality of spacing tabs 13, spaced uniformly around the reservoir 120, engage the inside surface of the enclosure 111 and position the reservoir 120 concentrically within the enclosure 111. The spacing tabs 131 extend to and are located on a portion of the top wall 123. The top wall 123 is cone-shaped and is nestable with the similarly shaped collector 115. In the assembled dispenser 110, the portions of the spacing tabs 131 on the top wall 123 position the bottom wall 123 in spaced-apart relation to the collector 115.

Referring still to FIG. 8, there is also shown a reservoir closure member 142 and a circular cap 112. The reservoir closure member 142 includes a bottom wall 122, a bottom wall retaining ring 134 and a holding cup 150. The retaining ring 134 is fixedly attached to the bottom wall 122 by connecting tabs 137. The holding cup 150 is fixedly attached to the bottom wall 122. The bottom wall 122 is cone-shaped and has a seat 144, which engages a beveled edge 143 of the reservoir 120 to seal the reservoir 120 in the assembled dispenser 110. An opening 125 is located opposite the bottom wall seat 144. A plurality of detents 133 are spaced uniformly around the underside surface of the cap 112. Concentrically located on the cap 112 is a metering cup 124.

When the cap 112 is attached to the closure member 142, the combination forms a subassembly. The cap 112 and the closure member 142 usually remain locked together, even when removed from the dispenser 110. The bottom wall retaining ring 134 locks onto the detents 133. The retaining ring 134 fits snugly into the recess 136 of each detent 133. The detents 133 and the retaining ring 134 are made from plastic or other relatively flexible material which has memory. Thus, when the retaining ring 134 is pressed into place, it snaps over the shoulder 135 of each detent 133. After the retaining ring 134 is snapped into the recesses 136, the shoulder 135 holds the ring 134 in each recess 136 such that the cap 112 and the closure member 142 form a unitary structure.

The cap retaining member 132 is generally annular in shape and has an inward flange 146, an outward flange 138 and a boss 147. The boss 147 fits over the flange 148 on the flared end 139 of the dispenser 110. The inside diameter of the boss 147 is slightly less than the outside diameter of the flange 148. The cap retaining member 132 is preferably made from a relatively flexible material having memory, such as plastic. The flexible material allows the boss 147 to be press fit over the flange 148, though the inside diameter of the boss 147 is slightly smaller that the outside diameter of the flange 148. When the cap retaining member 132 is attached to the dispenser 110, the flange 148 is located between the boss 147 and the inward flange 146. In the assembled dispenser 110, the cap 112 is sandwiched between the inward flange 146 and the flange 148 on the dispenser 110 to hold the cap 112 in place. The outward flange 138 provides a surface for a user to grasp when opening the dispenser 110 for filling, cleaning, or the like.

FIG. 9 shows a cross section through the dispenser 110 taken along line 9—9 in FIG. 7. The section shows the relationships among the elements of the assembled dispenser 110 at the flared end 139, the end which is dissembled when the dispenser 110 is opened. The cap retaining member 132 fits snugly over the flange 148 on the dispenser 110. The detents 133 retain the top wall retaining ring 134, which is connected to the top wall 122 of the reservoir 120 by the retaining tabs 137. The metering cup 124 is located adjacent to the opening 125. The holding cup 150 surrounds and is preferably concentric with the metering cup 124. The material reservoir 120 is held concentrically within the enclosure 111 by reservoir spacing tabs 131. The space between the enclosure 111 and the reservoir 120 defines a passageway 126 through which granulated material can flow when dispensing is effected. The handle 130 projects radially outward from the dispenser 110.

FIG. 10 shows a cross section through the dispenser 110 taken along line 10—10 of FIG. 7. The section shows granulated material within the reservoir 120. The outside diameter of the reservoir 120 is smaller than the inside diameter of the enclosure 111. The spacing tabs 131 attached to the reservoir 120 engage the inside surface of the enclosure 111 and concentrically nest the reservoir 120 within the enclosure 111. The space between the enclosure 111 and the reservoir 120 defines a passageway 126 through which granulated material can flow upon dispensing. The handle 130 is shown formed integrally with the enclosure 111. However, the handle 130 may be formed separately and attached to the enclosure 111 with welds, adhesive, mechanical fasteners or the like.

FIG. 11 shows a vertical section through the dispenser 110 taken along the line 11—11 in FIG. 9. FIG. 11 shows the relationships of elements along the height of the dispenser 110. Centrally located within the dispenser 110 is the material reservoir 120. The reservoir 120 comprises the cylindrical side wall 121, the top wall 123 and the bottom wall 122. The cone-shaped top wall 123 matches the similarly shaped collector 115 to maximize the storage volume of the reservoir 120. The bottom wall 122 of the reservoir 120 is similarly cone-shaped in the opposite direction to facilitate filling of the metering cup 124. The top wall 123 is integral with the side wall 121, whereas the bottom wall 122 is removable from the side wall 121 to facilitate filling of the reservoir 120. The bottom wall 122 can be removed from the assembled dispenser 110 by removing the cap retaining member 132 and removing the cap 112 and closure member 142 subassembly.

The reservoir 120 is sealed at the beveled edge 143 by the seat 144 on the bottom wall 122. The seat 144 on the bottom wall 122 is held against the beveled edge 144 of the reservoir 120 by the cooperation of the cap retaining member 132, the detents 133, the retaining ring 134 and the connecting tabs 137. Ultimately, the cap retaining member 132 holds the individual components together in the assembled dispenser 110.

In the assembled dispenser 110, a mouth 149 located at the bottom wall opening 125 protrudes from the bottom wall 122 into the metering cup 124. The wall of the holding cup 150 extends from the bottom wall 122 to a location preferably beyond the mouth 149. The volume of the holding cup 150 is preferably greater than the volume of the metering cup 124. The holding cup 150 makes the dispenser 110 generally spill proof.

When the dispenser 110 is inverted from the position shown, granulated material from the reservoir 120 flows through the mouth 149 into the metering cup 124. When the metering cup 124 fills to the level of the mouth 149, the granulated material stops flowing.

Before the dispenser 110 will dispense material the first time after filling the reservoir and returning the dispenser to the normal upright position (flared end 139 down), the dispenser 110 must be inverted and again returned to the upright position. These additional steps are required to initially fill the holding cup 150 and transfer the granulated material in the holding cup 150 to an annular space 152 surrounding the metering cup 124. When granulated material is in the annular space 152, the dispenser 110 is ready to dispense that material. Following the first dispensing after filling, the dispenser 110 will dispense granulated material each time it is inverted from the upright position until the dispenser is emptied.

The spacing tabs 131 spaced uniformly around the periphery of the side wall 121 position the reservoir concentrically within the enclosure 111. A portion of each spacing tab 131 extends onto the top wall 123 of the reservoir 120. The portions of the spacing tabs 131 on the top wall 123 position the top wall 123 in spaced-apart relation to the collector 115. The space between the reservoir side wall 121 and the enclosure 111 and the space between the reservoir top wall 123 and the collector 115 define a passageway 126 that communicates with the annular space 152 and the collector 115. The spacing tabs 131 are located only on a portion of the top wall 123. Longer spacing tabs 131 on the top wall 123 may act like baffle walls which would impede the uniform collection in the collector 115.

Upon dispensing, the metered amount of granulated material flows out of the annular space 152, through the passageway 126 and to the collector 115. At the same time, granulated material flows from the metering cup 124 into the holding cup 150. From the collector 115, the granulated material flows out of the collector opening 114 onto the conical diffuser 113. The plurality of apertures 119 in the conical surface of the diffuser 113 are spaced to evenly sprinkle the granulated material over a surface (not shown) below the diffuser 113. The baffle walls 128 fixedly attach the diffuser 113 to the collector 115. The baffle walls 128 help to distribute the granulated material more evenly to the diffuser 113 as the material exits from the collector opening 114. The baffle walls 128 continue through the diffuser 113 and form curved edges 140 which extend beyond the rim 141 of the diffuser 113. The curved edges 140 are provided such that when the dispense 110 is set down by a user, the dispenser must be placed in the upright position, thus filling the metering cup 124 and the annular space 152.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

what is claimed is:

1. A dispenser for sprinkling a preset quantity of a granulated material, such as table salt, comprising:
    a reservoir for storing granulated material, the reservoir having an opening therein;
    an enclosure encasing the reservoir, a passageway being defined therebetween;
    a metering cup positioned adjacent to the reservoir opening for receiving and measuring a quantity of granulated material from the reservoir through the reservoir opening, the material depositing into the metering cup upon the enclosure being placed in its normal upright position with the metering cup positioned below the reservoir, the metering cup communicating with the passageway to direct the quantity of granulated material into the passageway upon inversion of the enclosure; and
    a collector positioned within the enclosure, the collector communicating with the passageway to receive the quantity of granulated material through the passageway upon inversion of the dispenser, the collector having an opening therein for directing the granulated material out of the enclosure.

2. The dispenser of claim 1, further comprising a diffuser supported adjacent to the collector opening and opposite the collector, the diffuser having an outwardly sloping surface confronting the collector opening to spread the granulated material passing out of the collector opening.

3. The dispenser of claim 1, further comprising a cap for the enclosure, the cap secured to the enclosure proximate to the opening in the reservoir.

4. The dispenser of claim 1, wherein the reservoir and the enclosure are cylindrical and coaxial.

5. The dispenser of claim 4, wherein the opposite ends of the reservoir are cone-shaped.

6. The dispenser of claim 4, wherein the collector is cone-shaped.

7. The dispenser of claim 2, wherein the diffuser is cone-shaped and the tip of the cone is proximate to the collector opening.

8. The dispenser of claim 7, wherein the diffuser contains a plurality of apertures.

9. The dispenser of claim 3, wherein the cap, the metering cup and a portion of the reservoir adjacent to the reservoir opening form an integrated unit.

10. The dispenser of claim 4, further comprising an annular handle fixedly attached to and concentric with the enclosure.

11. The dispenser of claim 4, further comprising a handle fixedly attached to the enclosure.

12. A dispenser for sprinkling a preset quantity of a granulated material, such as table salt, comprising:
    a reservoir for storing granulated material, the reservoir having a side wall, a bottom wall, and a top wall, the bottom wall having an opening therein;
    an enclosure encasing the reservoir, the side wall of the reservoir being positioned inwardly of the enclosure and defining a passageway therebetween;
    a cap for the enclosure, the cap secured to the enclosure proximate to the bottom wall of the reservoir;
    a metering cup positioned within the cap for receiving and measuring a quantity of granulated material from the reservoir, the material depositing into the metering cup upon the enclosure being placed into its normal upright position with the cap being below the enclosure, the metering cup being aligned with the opening in the reservoir such that granulated material may pass from the reservoir, through the bottom wall opening and into the metering cup upon inversion of the enclosure, the metering cup communicating with the passageway between the enclosure and the sidewall of the reservoir, the metering cup adapted to direct the preset quantity of granulated material into the passageway upon inversion of the enclosure;
    a collector positioned within the enclosure adjacent to the top wall of the reservoir, the collector communicating with the passageway, and the collector having an opening therein and adapted to direct granulated material from the passageway to the collector opening; and
    a diffuser supported adjacent to the collector opening and opposite the collector, the diffuser having an outwardly sloping surface extending from the collector opening to spread the granulated material passing through the collector opening.

13. The dispenser of claim 12, wherein the reservoir side wall and enclosure are cylindrical and coaxial, and the cap is circular with an outer diameter substantially similar to the outside diameter of the enclosure.

14. The dispenser of claim 13, wherein the reservoir top wall and bottom wall are cone-shaped.

15. The dispenser of claim 13, wherein the collector is cone-shaped.

16. The dispenser of claim 13, wherein the diffuser is cone-shaped and the tip of the cone is proximate to the collector opening.

17. The dispenser of claim 16, wherein the diffuser contains a plurality of apertures.

18. The dispenser of claim 13, wherein the cap, metering cup, and reservoir bottom wall form an integrated unit.

19. The dispenser of claim 13, further comprising an annular handle fixedly attached to and concentric with the enclosure.

20. The dispenser of claim 13, further comprising a handle fixedly attached to the enclosure.

21. The dispenser of claim 13 further comprising a holding cup fixedly attached to the reservoir bottom wall, the holding cup having a side wall which is disposed around the metering cup for at least a portion of the height of the cup side wall and which is laterally spaced from the metering cup.

* * * * *